(12) United States Patent
Coffland

(10) Patent No.: US 7,546,603 B2
(45) Date of Patent: Jun. 9, 2009

(54) FLEXIBLE FEATURE INTERFACE FOR MULTIMEDIA SOURCES

(75) Inventor: Douglas R. Coffland, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1488 days.

(21) Appl. No.: 10/146,338

(22) Filed: May 13, 2002

(65) Prior Publication Data

US 2003/0212733 A1    Nov. 13, 2003

(51) Int. Cl.
G06F 9/54 (2006.01)
G06F 7/00 (2006.01)

(52) U.S. Cl. .................... 719/313; 707/104.1
(58) Field of Classification Search .......... 719/313; 707/104.1
See application file for complete search history.

(56) References Cited

U.S. PATENT DOCUMENTS

| | | | |
|---|---|---|---|
| 4,992,866 A | 2/1991 | Morgan | |
| 5,111,288 A | 5/1992 | Blackshear | |
| 5,717,379 A | 2/1998 | Peters | |
| 5,771,383 A | 6/1998 | Magee et al. | |
| 5,861,804 A | 1/1999 | Fansa et al. | |
| 5,872,594 A | 2/1999 | Thompson | |
| 6,018,739 A * | 1/2000 | McCoy et al. | 707/102 |
| 6,023,473 A | 2/2000 | Reine et al. | |
| 6,038,611 A | 3/2000 | Masel | |
| 6,173,068 B1 * | 1/2001 | Prokoski | 382/115 |
| 6,219,639 B1 * | 4/2001 | Bakis et al. | 704/246 |
| 6,271,752 B1 | 8/2001 | Vaios | |
| 6,308,887 B1 * | 10/2001 | Korman et al. | 235/379 |
| 6,680,746 B2 * | 1/2004 | Kawai et al. | 348/211.9 |
| 6,856,346 B1 * | 2/2005 | Kobayashi et al. | 348/211.99 |
| 6,970,183 B1 * | 11/2005 | Monroe | 348/143 |
| 7,039,221 B1 * | 5/2006 | Tumey et al. | 382/118 |
| 7,069,444 B2 * | 6/2006 | Lowensohn et al. | 713/185 |
| 7,116,357 B1 * | 10/2006 | Oya et al. | 348/211.8 |
| 2002/0056043 A1 * | 5/2002 | Glass | 713/179 |
| 2003/0018522 A1 * | 1/2003 | Denimarck et al. | 705/14 |
| 2003/0093430 A1 * | 5/2003 | Mottur | 707/10 |
| 2003/0109306 A1 * | 6/2003 | Karmarkar | 463/40 |
| 2004/0093349 A1 * | 5/2004 | Buinevicius et al. | 707/104.1 |

* cited by examiner

Primary Examiner—Meng-Ai An
Assistant Examiner—Abdou K Seye
(74) Attorney, Agent, or Firm—Eddie E. Scott; John H. Lee

(57) ABSTRACT

A flexible feature interface for multimedia sources system that includes a single interface for the addition of features and functions to multimedia sources and for accessing those features and functions from remote hosts. The interface utilizes the export statement: export "C" D11Export void FunctionName(int argc, char ** argv,char * result, SecureSession *ctrl) or the binary equivalent of the export statement.

20 Claims, 2 Drawing Sheets

FLEXIBLE FEATURE INTERFACE FOR MULTIMEDIA SOURCES

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to multimedia and more particularly to flexible features for multimedia sources.

2. State of Technology

U.S. Pat. No. 6,271,752 to Christos I. Vaios issued Aug. 7, 2001 for an intelligent multi-access system provides the following information, "Over the past few decades computers and communications technology has evolved into a complex infrastructure where countless different systems, platforms, and other products are now interoperable. Only recently has the concept of open systems become a reality, permitting new developments in standard-based file transfer, electronic mail, and remote log in. Opportunistically, society is becoming increasingly dependent on many of the new technologies made available via phone communications, private computer networks, and the Internet."

U.S. Pat. No. 5,771,383 to James Michael Magee, et al. issued Jun. 23, 1998 for a shared memory support method and apparatus for a microkernel data processing system provides the following information: "Operating systems can be classified as multi-user operating systems, multi-processor operating systems, multi-tasking operating systems, and real-time operating systems. A multiuser operating system allows two or more users to run programs at the same time. Some operating systems permit hundreds or even thousands of concurrent users. A multi-processing program allows a single user to run two or more programs at the same time. Each program being executed is called a process. Most multi-processing systems support more than one user. A multi-tasking system allows a single process to run more than one task. In common terminology, the terms multi-tasking and multi-processing are often used interchangeably even though they have slightly different meanings. Multi-tasking is the ability to execute more than one task at the same time, a task being a program. In multi-tasking, only one central processing unit is involved, but it switches from one program to another so quickly that it gives the appearance of executing all of the programs at the same time. There are two basic types of multi-tasking, preemptive and cooperative. In preemptive multi-tasking, the operating system parcels out CPU time slices to each program. In cooperative multi-tasking, each program can control the CPU for as long as it needs it. If a program is not using the CPU however, it can allow another program to use it temporarily. For example, the OS/2™ and UNIX™ operating systems use preemptive multi-tasking, whereas the Multi-Finder™ operating system for Macintosh™ computers uses cooperative multi-tasking. Multi-processing refers to a computer system's ability to support more than one process or program at the same time. Multi-processing operating systems enable several programs to run concurrently. Multiprocessing systems are much more complicated than single-process systems because the operating system must allocate resources to competing processes in a reasonable manner. A real-time operating system responds to input instantaneously. General purpose operating systems such as DOS and UNIX are not real-time."

U.S. Pat. No. 5,872,594 for a method for open loop camera control using a motion model to control camera movement to Paul A. Thompson, issued Feb. 16, 1999 provides the following information, "A typical surveillance application will have many more cameras than monitors, and fewer operators than monitors.—Controllable cameras in surveillance systems generally fall into three categories, 1) Inexpensive, manually operated, cameras only capable of movement responsive to manual pan, tilt, zoom, focus and iris commands from an operator, and which are the most common type, 2) More expensive, semi-automated cameras equipped with "preset" controls, which use servo mechanisms to position the camera to internally stored pan, tilt, zoom, focus, and iris positions. With this data, a plurality of "preset" views for each camera may be stored in the camera and used to direct the respective camera to a one, or a sequence, of these preset views responsive to operating a key on the keypad, and 3) very expensive cameras containing computers capable of complex operations such as communicating information to the camera control system.—Prior art of which Applicant is aware includes U.S. Pat. No. 4,992,866, issued to Morgan on Feb. 12, 1991. This reference discloses a camera control system requiring a number of computer controlled cameras, i.e., cameras that generate position information at the pan, tilt, zoom and focus motor drives and provide this information as feedback signals to operate the cameras in a closed loop configuration. These closed loop feedback signals are used in conjunction with a diagram that a user references to control movements of selected cameras. A conventional touch screen monitor and video switching matrix, under control of a microprocessor, provides a user with several options for selecting a particular camera, view, and monitor from a particular graphical representation. While this system provides a relatively simple way to use a touch screen to effect camera, view, and monitor selection, it is limited in that it requires an operator to select from a predefined list of fixed views, or "assets" located in the diagram, which are similar to presets. Further, there is no ability to select an arbitrary location to view, or to refer to entities to be viewed by name, as is found in a CADD drawing. Further yet, there is no disclosure in Morgan as to how the graphical representations relate to camera movement, or how these graphical representations are constructed. In addition, there is no capability for the system to monitor the camera video, or relate portions of the video to locations on the diagram. Another reference, U.S. Pat. No. 5,111,288, issued to Blackshear on May 5, 1992, discloses a feedback signal operated, closed loop camera system in conjunction with computer control used to store in memory one or more predetermined "presets," or views of particular interest. Computer routines are provided for controlling camera movements from one preset to another preset. Additional computer routines are provided for immediately moving a camera to view a preset responsive to an alarm. Again, the system of Blackshear requires "smart" cameras with feedback position information of the pan and tilt mechanisms, with the attendant high cost of the cameras. Also, as each preset and sequence of presets must be manually entered into the computer, the system lacks the versatility needed for a large surveillance operation, such as found in a gambling casino."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a flexible features interface for multimedia sources apparatus and method. In one embodiment the present invention includes at least one system, system constituents, an operating system; at least one features an/or functions module for interacting with the at least one system to actualize the system constituents, and an interface for connecting the system, the operating system, and the at least one features an/or functions module, wherein the interface utilizes the export statement: export "C" D11Export void FunctionName(int argc, char ** argv,char * result, SecureSession *ctrl) or the binary equivalent of the export statement. The at least one system can be any of a multitude of systems. For example, the system can be a security surveillance system. Another example of the system is an automated fingerprint identification system. Yet another example of the system is a system to collect and analyze biometrics data in humans. The system to collect and analyze biometrics data in humans can be a personal identification system in which people are recognized by their own unique corporal or behavioral characteristics. The system to collect and analyze biometrics data in humans can be a used for face recognition, iris and retinal scan, speech, facial thermograms, or hand geometry. The method includes providing a system, the system having system constituents; providing an operating system; providing at least one features an/or functions module that interacts with the at least one system to actualize the system constituents, and connecting the system, the operating system, and the at least one features an/or functions module through an interface, wherein the interface comprises the following export statement: export "C" D11Export void FunctionName(int argc, char ** argv,char*result, SecureSession *ctrl) or the binary equivalent of the export statement.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
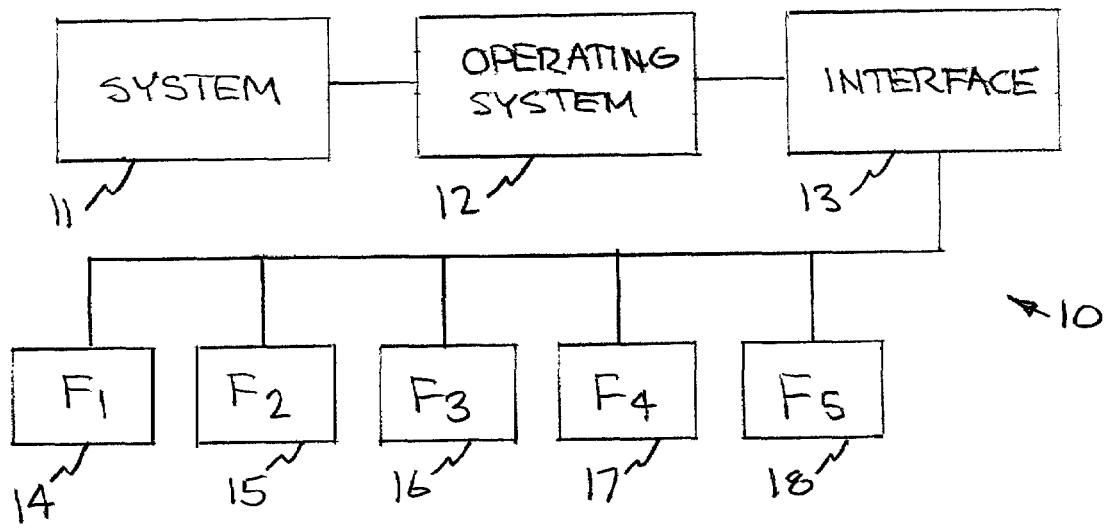
FIG. 1 illustrates one embodiment of a flexible features interface for multimedia sources system constructed in accordance with the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1, one embodiment of a flexible features interface for multimedia sources system constructed in accordance with the present invention is illustrated. The embodiment is generally designated by the reference numeral 10. The embodiment 10 includes at least one system 11. The at least one system 11 can be any of a multitude of systems. For example, the system 11 can be a security surveillance system. Another example of the system 11 is an automated fingerprint identification system. Yet another example of the system 11 is a system to collect and analyze biometrics data in humans. The system to collect and analyze biometrics data in humans can be a personal identification system in which people are recognized by their own unique corporal or behavioral characteristics. The system to collect and analyze biometrics data in humans can be a used for face recognition, iris and retinal scan, speech, facial thermograms, or hand geometry.

The system 11 is connected to an operating system 12. The operating system (OS) 12 can be any of the well-known operating systems including DOS, UNIX, Linux, Macintosh, and Windows; or a lesser or unknown operating system; or a yet to be developed operating system.

The OS 12 is connected to an interface 13. Multimedia sources are available in many differing types. These can be categorized by media type, such as video, audio, still frames, recorded media, and live media. Each of these types can have can be encoded in many different ways. Furthermore, control and status capabilities can vary widely with a particular type and encoding scheme. Also, new media types, encoding schemes, and control and status capabilities are continually coming available. In the flexible features interface for multimedia sources system 10, a single software interface is provided that will allow users to gain access to a multitude of features and functions, without worrying about the actual implementation details of the feature at the multimedia source. A multimedia source is only burdened with support for features that are loaded on that device. The interface 13 comprises the following export statement:—export "C" D11Export void FunctionName(int argc, char ** argv,char * result, SecureSession *ctrl)—or the binary equivalent of the export statement.

The interface 13 is operatively connected to at least one features/functions module. As shown in FIG. 1, features/functions module $F_1$ 14, features/functions module $F_2$ 15, features/functions module $F_3$ 16, features/functions module $F_4$ 17, through features/functions module $F_n$ 18 are operatively connected to interface 13. The features/functions modules $F_1, F_2, F_3, F_4$, through $F_n$ provide any number of features/functions modules 1 through n, where "n" is the highest number of features/functions modules. The features/functions modules $F_1, F_2, F_3, F_4$, through $F_n$ are constituents that provide the system 11 with features and capabilities. The embodiment of a flexible features interface for multimedia sources system 10 includes a single interface for the addition of features and functions to multimedia sources and for accessing those features and functions from remote hosts.

The flexible features interface for multimedia sources system 10 has numerous uses. For example the flexible features interface for multimedia sources system 10 can be used as a security surveillance system that includes a video surveillance camera connected to a digital network. The flexible features interface for multimedia sources system 10 can be a biometrics system. In a biometrics system the system 11 can be an automated fingerprint identification system connected to a digital network. The at least one system 11 (automated fingerprint identification system) includes utilizing features/functions modules $F_1$, $F_2$, $F_3$, $F_4$, through $F_n$ that provide the system 11 with features and capabilities. The system 11 can be used to collect biometrics data in human beings and analyzed in a number of ways. For example it can be used as a method of personal identification in which people are recognized by their own unique corporal or behavioral characteristics. The system 11 can be used for face recognition, iris and retinal scan, speech, facial thermograms, and hand geometry.

The flexible features interface for multimedia sources system 10 provides the ability to add and remove features and capabilities from multimedia sources in a modular fashion. In addition, it allows remote hosts to access and use those features and capabilities without knowledge of the implementation details. This provides several advantages.

First, this allows the multimedia source to easily incorporate new hardware as it comes available. For instance, if it becomes necessary to replace a unit within the system 11 with a different or newer unit, the system 11 can accommodate this with no modifications to the main application software.

Second, this allows the multimedia source to provide a multitude of different functions. Examples in a video surveillance camera include fixed cameras, pan/tilt/zoom cameras, indoor, outdoor, low light, motion detection, object recognition, sound, and others.

Third, this allows the customer to save money by only purchasing the features needed for the application being served. Run-time license fees are not uncommon in commercial multimedia processing software. This configuration flexibility will prevent the user from paying for runtime licenses on features that are not being used in the application.

Figure 2:
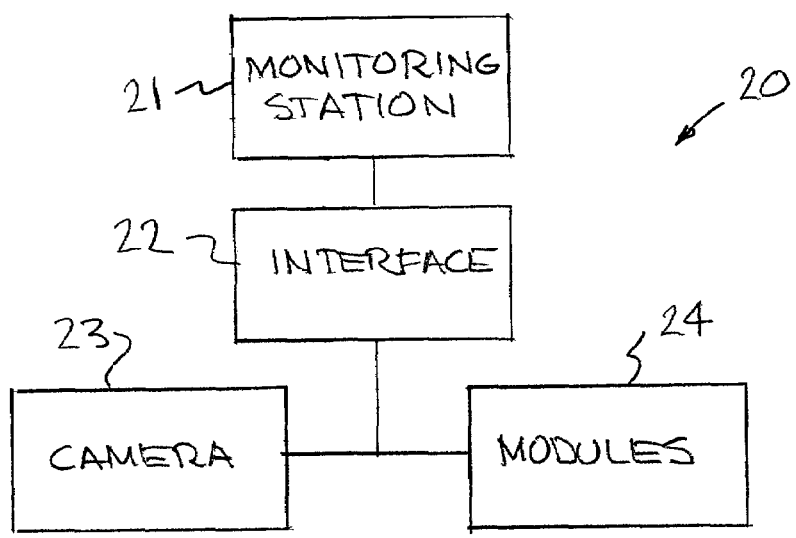
FIG. 2 illustrates another embodiment of a flexible features interface for multimedia sources system constructed in accordance with the present invention.

Referring now to FIG. 2 another embodiment of a flexible features interface for multimedia sources system, generally designated by the reference numeral 20, is illustrated that provides the ability to add and remove features and capabilities from multimedia sources in a modular fashion. In addition, it allows remote hosts, such as a video camera 23, to access and use those features and capabilities without knowledge of the implementation details. This provides a number of advantages. First, this allows the multimedia source to easily incorporate new hardware as it comes available. For instance, if it becomes necessary to replace the video camera with a different or newer video camera, the camera can accommodate this with no modifications to the main application software. Second, this allows the multimedia source to provide a multitude of different functions. Examples include fixed cameras, pan/tilt/zoom cameras, indoor, outdoor, low light, motion detection, object recognition, sound, and others. Third, this allows the customer to save money by only purchasing the features needed for the application being served. Run-time license fees are not uncommon in commercial multimedia processing software. This configuration flexibility will prevent the user from paying for runtime licenses on features that are not being used in the application.

As illustrated in FIG. 2, this embodiment of a flexible features interface for multimedia sources system 20 includes at least one video camera 23, at least one monitoring station 21, and a modules unit with individual constituent. The monitor station 21 is a viewer workstation and can include viewer workstation action constituents. The constituents can be camera action constituents, work station constituents, or other constituents. For example, the camera action constituents can include such camera actions as a start playing constituent, a stop playing constituent, a zoom constituent, a focus constituent, a pan constituent, and/or a tilt constituent. The modules unit 24 interacts with the camera 23 to actualize the camera action constituents and with the viewer workstation 24 to actualize the viewer workstation constituents.

The interface 22 allows users to gain access to the multitude of features and functions in the modules unit 24, without worrying about the actual implementation details of the features and functions at the multimedia source. A multimedia source is only burdened with support for features and functions that are loaded on that device. The interface 22 comprises the following export statement:—export "C" D11Export void FunctionName(int argc, char ** argv,char * result, SecureSession *ctrl)—or the binary equivalent of the export statement.

Multimedia sources are available in many differing types. These can be categorized by media type, such as video, audio, still frames, recorded media, and live media. Each of these types can have can be encoded in many different ways. Furthermore, control and status capabilities can vary widely with a particular type and encoding scheme. Finally, new media types, encoding schemes, and control and status capabilities are continually coming available. As such, a single interface is required that will allow remote users to gain access to this multitude of features and functions, without worrying about the actual implementation details of the feature at the multimedia source. Furthermore, a multimedia source should only be burdened with support for features that are loaded on that device. The system 20 provides a single interface 22 for the addition of features and functions to multimedia sources and for accessing those features and functions from remote hosts.

Figure 3:
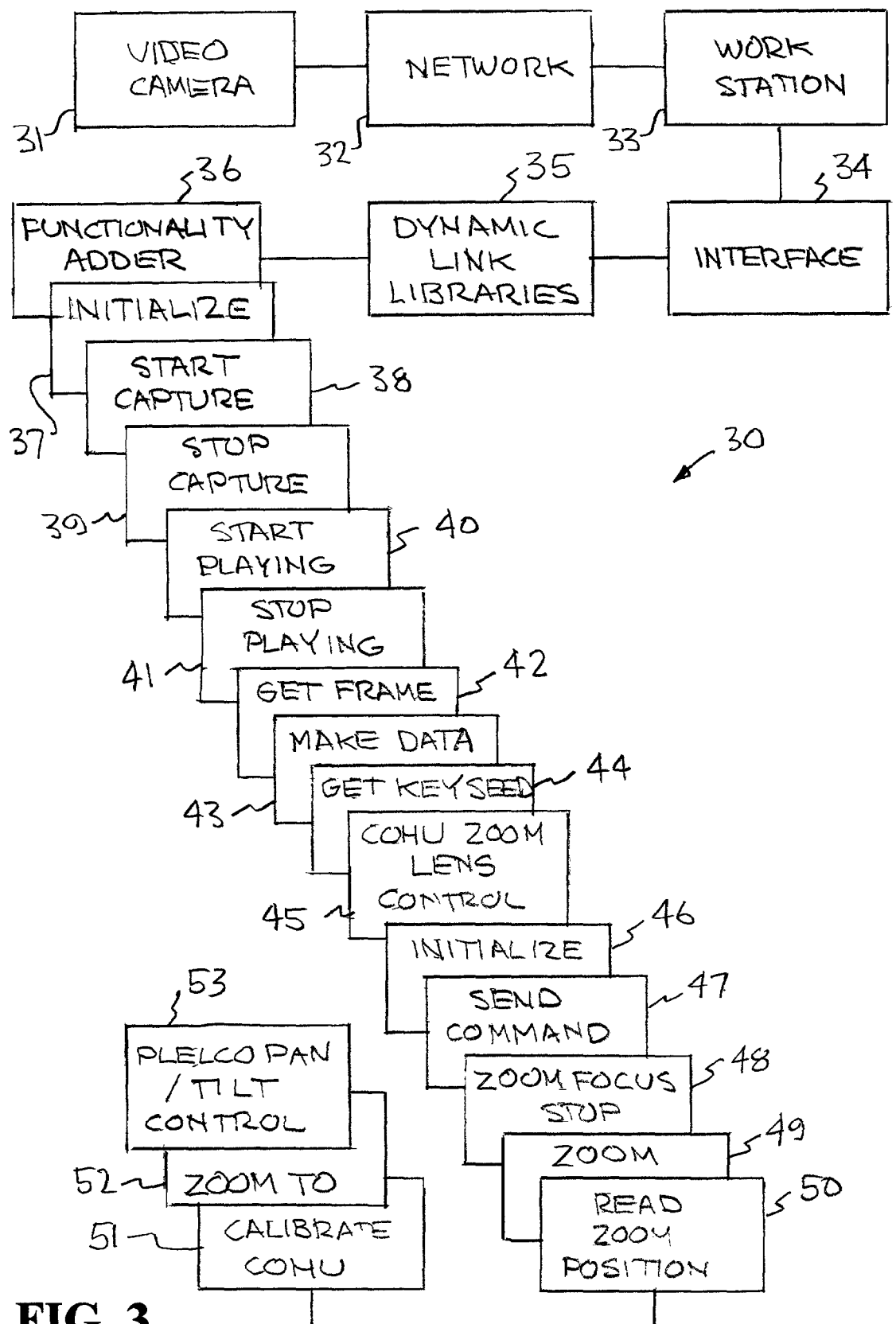
FIG. 3 shows an embodiment of a flexible features interface for multimedia sources system having a digital camera/computer system connected to a digital network.

Referring now to FIG. 3, another embodiment of a flexible features interface for multimedia sources system constructed in accordance with the present invention is illustrated. The embodiment is generally designated by the reference numeral 30. There is an increasing need for automated surveillance systems in private, government, airport, commercial, law enforcement, border, and military applications. In 1997, the Defense Advanced Research Projects Agency (DARPA) Information Systems Office began a three-year program to develop Video Surveillance and Monitoring (VSAM) technology. The objective of the VSAM project was to develop automated video understanding technology for use in future urban and battlefield surveillance applications. Technology advances developed under this project enable a single human operator to monitor activities over a broad area using a distributed network of active video sensors. The sensor platforms are mainly autonomous, notifying the operator only of salient information as it occurs, and engaging the operator minimally to alter platform operations.

The embodiment 30 includes at least one digital camera/computer system 31 connected to a digital network 32. The camera/computer system 31 is part of a video surveillance system. At least one viewer workstation 33 forms part of the digital network 32. The digital network 32 includes a 100BaseT local area network switch. The switch allows video and control information to be passed between the cameras 31 and the viewer workstations 33. The switch supports multiple simultaneous control and video streams to be passed over the network 32 simultaneously. The digital network 32 can be an internal or external network. The system 30 includes a single interface 34 for the addition of features and functions to multimedia sources and for accessing those features and functions from remote hosts. Features and functions are provided through the use of dynamic link libraries 35. The dynamic link libraries 35 are files containing executable code that can be loaded and linked by a calling application at run-time.

The flexible features interface for multimedia sources system 30 of the present invention provides a single interface for the addition of features and functions to multimedia sources and for accessing those features and functions from remote hosts. The system 30 provides the ability to add and remove features and capabilities from multimedia sources in a modular fashion. The system 30 includes a "Dynamic Link Libraries" section 35. Examples of the modular functions and features provided by the Dynamic Link Libraries 35 are illustrated in FIG. 3 and include, Functionality Added 36, Initialize 37, StartCapture 38, StopCapture 39, StartPlaying 40, StopPlaying 41, GetFrame 42, MakeDataKey 43, GetKeySeed 44, Cohu Zoom Lens Control 45, Initialize 46, SendCommand 47, ZoomFocusStop 48, Zoom 49, ReadZoomPos 50, CalibrateCohu 51, ZoomTo 52, and Pelco Pan/Tilt Control 53. It is to be understood that other functions and features can be included in the Dynamic Link Libraries 35.

Functions and features are provided through the Dynamic Link Libraries (DLL's) 35. DLL's 35 are files containing executable code that can be loaded and linked by a calling application at run-time. DLL's are commonly used on several operating systems. A specific set of rules or DLL's intended for use in the multimedia source devices. All arguments and results are sent in ASCII text form. (1) DLL's must export each function that must be called by the main application, (2) the export statement must take the exact form: export "C" Dl1Export void FunctionName(int argc, char ** argv,char * result, SecureSession *ctrl), (3) each exported function must take the following form: Dl1Export void Initialize(int argc, char ** argv,char * result, SecureSession *ctrl) { }, (4) each DLL file must export exactly one function named Initialize, and (5), DLL's must write all output messages to the common eventlog. DLL's gain access to the common event log by defining the following prototype: typedef void (CALLBACK *WRITELOG)(int remoteLogging, char*message) WRITELOG WriteLog. Arguments to the exported functions include the following: 1. argc—the number of arguments passed to the function (not including the feature name). 2. argv—a list of ascii strings that are the arguments to the function. 3. result—a pointer to an array of characters where the result will be written. 4. ctrl—a pointer to the SecureSession object that can be used by the function to communicate directly with the remotely connected host associated in a secure fashion.

The process 30 shown in FIG. 3 illustrates the steps, (1) loads all configurable features, (2) starts winsock network services, (3) calls the "StartCapture" feature to start capturing video frames, (4) creates a MulticastSession object that will be used for secure transmission of multicast video. (Video transmission is not started, the object is just created,) (5) creates a data key in preparation for a request to receive video, (6) establishes a multicast session for the transmission of secure multicast video, and (7) enters a loop and waits for connection requests.

The multi-user control system for multi-media sources method includes a software control system capable of simultaneously sending real time video data to many remote receivers, while exchanging control and status information with any or all of the remote receivers. A connection mechanism is provided for connecting to remote Camera viewers, status monitors, and controllers. The system and process 30 provides transmission of live and recorded multimedia information across digital networks. The system and process 30 automatically loads the feature configuration describing all Camera flexible features interface that are available on the network. The system and process 30 captures messages from the remote network users and passes the messages to the Camera feature modules for execution. The system and process 30 send results for Camera feature execution to the remote users. The system and process 30 provides a central logging capability that can also be displayed to users at remote systems. The system and process 30 provides a system for exchanging files with remote controllers. The system and process 30 provides for remote software updates.

The flexible features interface for multimedia sources system and method 30 includes a software control system capable of simultaneously sending real time video data to many remote receivers, while exchanging control and status information with any or all of the remote receivers. A connection mechanism is provided for connecting to remote cameras, viewers, status monitors, and controllers. The system and process 30 provides transmission of live and recorded multimedia information across digital networks. The system and process 30 automatically loads the feature configuration describing camera, workstation, and other flexible features that are available on the network. The system and process 30 captures messages from the remote network users and passes the messages for execution. The system and process 30 send results for camera feature execution to the remote users. The system and process 30 provides a central logging capability that can also be displayed to users at remote systems. The system and process 30 provides a system for exchanging files with remote controllers. The system and process 30 provides for remote software updates. The security surveillance system 30 provides simultaneous viewing and controlling of a single video resource or multiple video resources by multiple viewers. The security surveillance system 30 provides for the sharing of resources on the digital network among multiple users. The system 30 provides the ability to add and remove features and capabilities from multimedia sources in a modular fashion. It allows remote hosts to access and use those features and capabilities without knowledge of the implementation details. This provides several advantages.

First, this allows the multimedia source to easily incorporate new hardware as it comes available. For instance, if it becomes necessary to replace the attached video camera with a different or newer video camera, the camera can accommodate this with no modifications to the main application software.

Second, this allows the multimedia source to provide a multitude of different functions. Examples include fixed cameras, pan/tilt/zoom cameras, indoor, outdoor, low light, motion detection, object recognition, sound, and others.

Third, this allows the customer to save money by only purchasing the features needed for the application being served. Run-time license fees are not uncommon in commercial multimedia processing software. This configuration flexibility will prevent the user from paying for runtime licenses on features that are not being used in the application.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A video surveillance apparatus comprising:
    a digital network;

a digital camera and computer system coupled to the digital network;

a biometrics unit;

at least one viewer workstation connected to said digital network and dynamic link libraries; and an interface connecting said digital camera and computer system, said digital network, said biometrics unit, and said dynamic link libraries, wherein said dynamic link libraries include: a functionality added unit, a first initialize unit, a startcapture unit, a stopcapture unit, a startplaying unit, a stopplaying unit, a getframe unit, a makedatakey unit, a getkeyseed unit, a cohu zoom lens control unit, a second initialize unit, a sendcommand unit, a zoomfocusstop unit, a zoom unit, a calibrate cohu unit, a zoomto unit, and a pelco pan and tilt control unit, wherein said biometrics unit is a system for collecting and analyzing biometrics data in humans, wherein said system for collecting and analyzing biometrics data in humans is an automated fingerprint identification system and a personal identification system in which people are recognized by their own unique corporal or behavioral characteristics.

2. the video surveillance apparatus of claim 1, wherein said digital camera and computer system is a security surveillance system.

3. The video surveillance apparatus of claim 2, wherein said security surveillance system includes a video surveillance camera.

4. A biometrics apparatus, comprising:

a biometrics unit, a video surveillance camera in said biometrics unit, a work station, an operating system, a multiplicity of features and functions modules for interacting with said biometrics unit, said work station, and said operating system; and an interface for connecting said biometrics unit, said work station, said operating system, and said features and functions modules, wherein said interface utilizes an export statement: export "C" D11Export void FunctionName(int argc, char ** argv, char * result, SecureSession *ctrl) or the binary equivalent of said export statement, wherein said biometrics unit is a system for collecting and analyzing biometrics data in humans, wherein said system for collecting and analyzing biometrics data in humans is an automated fingerprint identification system and a personal identification system in which people are recognized by their own unique corporal or behavioral characteristics.

5. The biometrics unit of claim 4 wherein said biometrics unit is a security surveillance system.

6. The biometrics unit of claim 5 wherein said security surveillance system includes a video surveillance camera.

7. The biometrics unit of claim 6 wherein said features and functions modules include camera action commands.

8. The biometrics unit of claim 7 wherein said camera action commands include start playing commands and stop playing commands.

9. The biometrics unit of claim 7 wherein said camera action commands include zoom commands.

10. The biometrics unit of claim 7 wherein said camera action commands include focus commands.

11. The biometrics unit of claim 7 wherein said camera action commands include pan commands.

12. The biometrics unit of claim 7 wherein said camera action commands include tilt commands.

13. The biometrics unit of claim 7 wherein said camera action commands include start capture commands and stop capture commands.

14. The biometrics unit of claim 7 wherein said camera action commands include start playing commands, stop playing commands, zoom commands, focus commands, pan commands, and tilt commands.

15. The biometrics unit of claim 4, wherein said personal identification system in which people are recognized by their own unique corporal or behavioral characteristics is a face recognition system.

16. The biometrics unit of claim 4, wherein said personal identification system in which people are recognized by their own unique corporal or behavioral characteristics is an iris and/or retinal scan system.

17. The biometrics unit of claim 4, wherein said personal identification system in which people are recognized by their own unique corporal or behavioral characteristics is a speech recognition system.

18. The biometrics unit of claim 4, wherein said personal identification system in which people are recognized by their own unique corporal or behavioral characteristics is voice identification system.

19. The biometrics unit of claim 4, wherein said personal identification system in which people are recognized by their own unique corporal or behavioral characteristics is facial thermograms system.

20. The biometrics unit of claim 4, wherein said personal identification system in which people are recognized by their own unique corporal or behavioral characteristics is hand geometry system.

\* \* \* \* \*